United States Patent Office 3,436,368
Patented Apr. 1, 1969

3,436,368
DI-(4-PIPERIDYL)-ALKANES AS RUBBER ANTIOZONANTS
Robert W. Murray, Warren N.J., assignor to Bell Telephone Laboratories, Incorporated, Murray Hill, N.J., a corporation of New York
No Drawing. Filed Apr. 28, 1967, Ser. No. 634,462
Int. Cl. C08c 11/52; C07d 29/02
U.S. Cl. 260—45.8          4 Claims

ABSTRACT OF THE DISCLOSURE

Di-(4-piperidyl)-alkanes have been found to give protection against ozone cracking of butadiene rubbery polymers and are essentially non-discoloring and non-staining.

---

This invention relates to the protection of rubber from the degradative consequences of attack by ozone. More particularly, the present invention relates to the use of di-(4-piperidyl)-alkanes as antiozonants for rubbery polymers.

It is well known that articles manufactured from synthetic and natural rubbers by vulcanization are subject to cracking upon prolonged exposure to the atmosphere, such cracking being attributed to small quantities of ozone in the atmosphere. Accordingly, workers in the art have proposed a wide variety of antiozonants which are designed to counteract the deleterious effects of ozone. Unfortunately, the vast majority of these compositions become discolored under the influence of light or result in staining of the rubber, so limitng their use to dark colored rubbers including carbon black. Those compositions which did not become discolored or stained were found to be subject to degradation due to ozone attack. Thus, the search has continued for effective antiozonants which are not subject to the noted deficiencies.

In accordance with the present invention, an antiozonant meeting the desired criteria is described. It has been found that compounds of the general formula

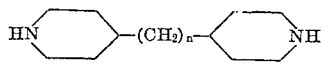

are uniquely adapted for protecting natural or synthetic rubbers against the action of ozone while evidencing little or no discoloration under the influence of light and no staining. In the noted formula, $n$ is an integer ranging from 1-10.

The rubbers protected by the antiozonants described herein may be defined as inclusive of any sulfur vulcanizable, natural or synthetic butadiene rubber which is susceptible to attack by ozone. It will be understood by those skilled in the art that such terminology includes both the rubbery homopolymers and copolymers of butadiene such as polybutadiene rubber, styrene-butadiene rubber, etc., and the presence of addition agents in the rubber formulation for the purpose of improving other characteristics. Thus, for example, it may be advantageous to add an accelerator activator such as one of the metallic oxides (for example, zinc oxide or magnesium oxide) or organic acids (for eample, stearic acid) or combinations of both a metallic oxide and an organic acid. It may also be desirable to add accelerators to reduce the time and temperature required to effect vulcanization or softeners or similar materials which, when added to a rubber compound, will render the plastic non-vulcanized compound more plastic and will make the elastic vucanization compound softer. It will also be understood that the described compositions may be used with monocrystalline or paraffin waxes or blends of both in the usual manner of compounding to achieve a formulation which will resist ozone-caused cracking.

In the practice of the present invention, it has been found necessary to employ from 1–10 parts of antiozonant per 100 parts of rubber, by weight. The use of less than the noted minimum fails to result in satisfactory protection, whereas increasing the amount of antiozonant beyond the noted maximum fails to result in any further enhancement.

The compounds contemplated for use in accordance with the present invention are di-(4-piperidyl)-methane; 1,2-di-(4-piperidyl)-ethane; 1,3-di-(4-piperidyl)-propane; 1,4-di-(4-piperidyl)-butane; 1,5-di-(4-piperidyl)-pentane; 1,6-di-(4-piperidyl)-hexane; 1,7-di-(4-piperidyl)-heptane; 1,8-di-(4-piperidyl)-octane; 1,9-di-(4-piperidyl)-nonane; and 1,10-di-(4-piperidyl)-decane.

The piperidyl alkanes alluded to hereinabove may conveniently be synthesized by reacting the lithium salt of gamma picoline with the appropriate dibromide, e.g., methylene dibromide, 1,2-dibromoethane, 1,3-dibromopropane, etc., and subsequently reducing the picoline nuclei in the resultant compounds to the corresponding piperidine rings with sodium and alcohol.

A more detailed illustration of the present invention is set forth in the following example:

EXAMPLE 100.0 parts, by weight, of styrene-butadiene rubber, 5.0 parts, by weight, of zinc oxide, 1.0 part, by weight, of stearic acid, 4.0 parts, by weight of sulfur, 10.0 parts, by weight, of titanium dioxide (a whitener) and 10.0 parts, by weight, of silicon dioxide (a whitener) were mixed together. To this mixture which was employed as a control, 1.5 part, by weight, of an accelerator, N-cyclohexyl-2-benzothiazole sulfenamide, was added. The resultant composition was cured at 140° C. Following, the cured composition was cut in 6-inch by ½-inch strips, which were subsequently put on test racks and stretched to 20 percent elongation and exposed to 25 parts per hundred million of ozone at 35° C. (ASTM–D1149–62T). Cracking time, that is, the first observation of any cracks with the unaided eye, was then noted. The control cracked within 40 hours.

For comparative purposes, the procedure was repeated with the noted concentration of antiozonant, equivalent states of cure being employed in all cases. The results are set forth in the table below:

TABLE

| Antiozonant | Concentration (parts per hundred rubber) | Time to cracking |
|---|---|---|
| 1,3-di-(4-piperidyl)-propane | 1 | 2 days. |
| Do | 2 | Do. |
| Do | 3 | 1 week. |
| Do | 4 | 12 days. |
| Do | 5 | >32 weeks. |
| Do | 6 | >23 weeks. |
| Do | 7 | >57 weeks. |

What is claimed is:
1. A composition comprising a sulfur vulcanizable rubbery butadiene polymer and from 1–10 parts per 100 parts of rubber, by weight, of an antiozonant composition having the general formula

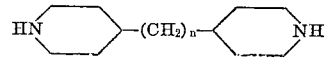

wherein $n$ is an integer from 3–10.
2. A composition in accordance with claim 1 wherein said antiozonant is 1,3-di-(4-piperidyl)-propane.

3. A composition in accordance with claim 1 wherein said polymer is styrene-butadiene.

4. A composition in accordance with claim 2 wherein said polymer is styrene-butadiene.

References Cited

UNITED STATES PATENTS 2,306,779  12/1942  Coleman _____ 260—800
3,352,870  11/1967  Cislak et al. _____ 260—293
3,384,614  5/1968  Rosenwald _____ 260—45.9

DONALD E. CZAJA, *Primary Examiner.*

R. A. WHITE, *Assistant Examiner.*

U.S. Cl. X.R.

260—293, 800